(12) United States Patent
Mukae et al.

(10) Patent No.: US 8,987,348 B2
(45) Date of Patent: Mar. 24, 2015

(54) INK JET INK, INK JET RECORDING METHOD, INK CARTRIDGE, RECORDING UNIT AND INK JET RECORDING APPARATUS

(75) Inventors: Fumihiko Mukae, Tokyo (JP); Masashi Ogasawara, Machida (JP); Souichi Nagai, Kawasaki (JP); Shuichi Okazaki, Fujisawa (JP); Shin-ichi Hakamada, Kawasaki (JP); Yoshio Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 634 days.

(21) Appl. No.: 12/303,218

(22) PCT Filed: May 21, 2008

(86) PCT No.: PCT/JP2008/059759
§ 371 (c)(1),
(2), (4) Date: Dec. 2, 2008

(87) PCT Pub. No.: WO2008/146824
PCT Pub. Date: Dec. 4, 2008

(65) Prior Publication Data
US 2009/0258145 A1 Oct. 15, 2009

(30) Foreign Application Priority Data

May 25, 2007 (JP) ................................ 2007-138869
May 19, 2008 (JP) ................................ 2008-130347

(51) Int. Cl.
| | | |
|---|---|---|
| A61K 9/16 | (2006.01) |
| B41J 2/01 | (2006.01) |
| B41J 2/17 | (2006.01) |
| B41J 2/175 | (2006.01) |
| C08J 3/00 | (2006.01) |
| C08K 5/06 | (2006.01) |
| C08L 31/00 | (2006.01) |
| C08L 33/00 | (2006.01) |
| C09D 5/00 | (2006.01) |
| C09D 5/02 | (2006.01) |
| C09D 11/00 | (2014.01) |
| C09D 11/10 | (2014.01) |
| C09J 7/02 | (2006.01) |
| G01D 11/00 | (2006.01) |
| B41M 5/00 | (2006.01) |
| C09D 11/322 | (2014.01) |
| C09D 11/326 | (2014.01) |
| C09D 11/38 | (2014.01) |

(52) U.S. Cl.
CPC .......... B41M 5/0023 (2013.01); C09D 11/322 (2013.01); C09D 11/326 (2013.01); C09D 11/38 (2013.01)
USPC ................ 523/160; 347/1; 347/84; 347/85; 347/86; 347/95; 347/100; 523/161; 524/366; 524/377; 524/543; 524/556

(58) Field of Classification Search
USPC ............. 523/160, 161; 347/1, 84, 85, 86, 95, 347/100; 524/366, 377, 543, 556
See application file for complete search history.

(56) References Cited

U.S. PATENT DOCUMENTS

| | | | |
|---|---|---|---|
| 5,782,967 A | 7/1998 | Shirota et al. | ............... 106/31.58 |
| 5,849,815 A | 12/1998 | Aoki et al. | ..................... 523/161 |
| 5,854,307 A * | 12/1998 | Kimura et al. | ................ 523/161 |
| 5,883,157 A | 3/1999 | Yamashita et al. | |
| 5,954,866 A | 9/1999 | Ohta et al. | ................. 106/31.89 |
| 5,969,005 A | 10/1999 | Yamashita et al. | |
| 6,033,463 A * | 3/2000 | Yui et al. | ..................... 106/31.27 |
| 6,036,307 A | 3/2000 | Hakamada et al. | ........... 347/106 |
| 6,074,052 A | 6/2000 | Inui et al. | ....................... 347/101 |
| 6,214,963 B1 | 4/2001 | Noguchi et al. | ................. 528/71 |
| 6,378,999 B1 | 4/2002 | Doi et al. | |
| 6,398,355 B1 | 6/2002 | Shirota et al. | ................. 347/100 |

(Continued)

FOREIGN PATENT DOCUMENTS

| | | |
|---|---|---|
| CN | 1829778 A | 9/2006 |
| EP | 1 443 085 A1 | 8/2004 |

(Continued)

OTHER PUBLICATIONS

Author unknown, The BASF Technical Information bulletin "Pluronic PE Types", Feb. 1996, pp. 1-12.*
Dec. 10, 2009 International Preliminary Report on Patentability and Jul. 8, 2008 Written Opinion in International Patent Application No. PCT/JP2008/059759.
Japanese Office Action dated Dec. 4, 2012, in counterpart Japanese Application No. 2008-130347, and English-language translation thereof.
Apr. 26, 2012 Official Action in European Patent Appln. No. 08764775.6.

(Continued)

*Primary Examiner* — Patrick Niland
(74) *Attorney, Agent, or Firm* — Fitzpatrick, Cella, Harper & Scinto

(57) ABSTRACT

The invention provides provide an ink jet ink exhibiting such an excellent ejection property that when an ink containing a polymer capable of improving the scratch resistance of a recorded article is used, the deviation of the ink-droplet impact point on a recording medium is prevented. The ink jet ink contains a polymer and a surfactant, wherein the acid value of the polymer is from 100 mg KOH/g or more to 220 mg KOH/g or less, the weight-average molecular weight of the polymer is from 3,000 or more to 10,000 or less, and the surfactant has a structure represented by the following formula (1)

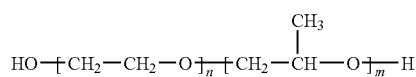

wherein n is a numerical value of from 3 or more to 27 or less, and m is a numerical value of from 16 or more to 31 or less.

17 Claims, 6 Drawing Sheets

(56) References Cited

U.S. PATENT DOCUMENTS

| | | | |
|---|---|---|---|
| 6,474,803 B1 | 11/2002 | Shirota et al. | 347/100 |
| 6,552,156 B2 | 4/2003 | Noguchi et al. | 528/71 |
| 6,676,254 B2 | 1/2004 | Nagashima et al. | 347/100 |
| 6,683,121 B2 * | 1/2004 | Chiou et al. | 523/161 |
| 6,698,876 B2 | 3/2004 | Sato et al. | 347/100 |
| 6,723,137 B1 | 4/2004 | Hakamada et al. | 8/549 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,141,105 B2 | 11/2006 | Udagawa et al. | 106/31.49 |
| 7,144,449 B2 | 12/2006 | Udagawa et al. | 106/31.15 |
| 7,185,978 B2 | 3/2007 | Nagashima et al. | 347/100 |
| 7,195,340 B2 | 3/2007 | Nagashima et al. | 347/56 |
| 7,208,032 B2 | 4/2007 | Hakamada et al. | 106/31.27 |
| 7,276,112 B2 | 10/2007 | Tokuda et al. | 106/31.6 |
| 7,291,211 B2 | 11/2007 | Kaneko et al. | 106/31.27 |
| 7,291,214 B2 | 11/2007 | Tsuji et al. | 106/31.8 |
| 7,297,202 B2 | 11/2007 | Ichinose et al. | 106/31.6 |
| 7,297,203 B2 | 11/2007 | Takada et al. | 106/31.8 |
| 7,354,145 B2 | 4/2008 | Nito et al. | 347/96 |
| 7,377,631 B2 | 5/2008 | Takada et al. | 347/100 |
| 7,381,257 B2 | 6/2008 | Takayama et al. | 106/31.78 |
| 7,402,200 B2 | 7/2008 | Imai et al. | 106/31.27 |
| 7,429,291 B2 | 9/2008 | Udagawa et al. | 106/31.15 |
| 7,464,965 B2 | 12/2008 | Udagawa et al. | 283/92 |
| 7,517,073 B2 | 4/2009 | Nito et al. | 347/100 |
| 7,517,074 B2 | 4/2009 | Hakamada et al. | 347/100 |
| 7,537,329 B2 | 5/2009 | Nito et al. | 347/96 |
| 8,011,777 B2 | 9/2011 | Yamashita et al. | |
| 2004/0244622 A1 | 12/2004 | Ichinose et al. | 101/491 |
| 2005/0204955 A1 | 9/2005 | Nagashima et al. | 106/31.59 |
| 2005/0264629 A1 | 12/2005 | Fukuda et al. | 347/100 |
| 2006/0098068 A1 | 5/2006 | Hakamada et al. | 347/100 |
| 2006/0103704 A1 | 5/2006 | Hakamada et al. | 347/100 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0165086 A1 | 7/2007 | Sekiguchi et al. | 347/100 |
| 2007/0191508 A1 | 8/2007 | Nakagawa et al. | 523/160 |
| 2007/0209551 A1 | 9/2007 | Fukuda et al. | 106/31.58 |
| 2007/0216740 A1 | 9/2007 | Fukuda et al. | 347/86 |
| 2007/0263032 A1 | 11/2007 | Sekiguchi | |
| 2008/0124481 A1 | 5/2008 | Nakajima et al. | 427/466 |
| 2008/0136875 A1 | 6/2008 | Iwata et al. | 347/85 |
| 2008/0152827 A1 | 6/2008 | Hakamada et al. | 427/466 |
| 2008/0193647 A1 | 8/2008 | Saito et al. | 427/256 |
| 2008/0193659 A1 | 8/2008 | Takada et al. | 427/407.1 |
| 2008/0252708 A1 | 10/2008 | Hakamada et al. | 347/95 |
| 2008/0292793 A1 | 11/2008 | Yamashita et al. | |
| 2009/0053414 A1 | 2/2009 | Fujioka et al. | 427/256 |
| 2009/0074967 A1 | 3/2009 | Matsumoto et al. | 427/256 |
| 2009/0078889 A1 | 3/2009 | Udagawa et al. | 250/492.1 |

FOREIGN PATENT DOCUMENTS

| | | |
|---|---|---|
| EP | 1 995 287 A1 | 11/2008 |
| JP | 5-247392 A | 9/1993 |
| JP | 6-136306 A | 5/1994 |
| JP | 8-143804 A | 6/1996 |
| JP | 9-157564 A | 6/1997 |
| JP | 9-194781 A | 7/1997 |
| JP | 10-017803 A | 1/1998 |
| JP | 10-72561 A | 3/1998 |
| JP | 2000-290556 A | 10/2000 |
| JP | 2004-352861 A | 12/2004 |
| JP | 2005-8849 A | 1/2005 |
| JP | 2006-117883 A | 5/2006 |
| JP | 2006-199744 A | 8/2006 |

OTHER PUBLICATIONS

Mar. 28, 2012 Official Action in Chinese Patent Appln. No. 200880014331.3.

Nov. 16, 2011 Official Action in Chinese Patent Appln. No. 200880014331.3.

International Search Report and Written Opinion of PCT/JP2008/059759.

* cited by examiner

INK JET INK, INK JET RECORDING METHOD, INK CARTRIDGE, RECORDING UNIT AND INK JET RECORDING APPARATUS

TECHNICAL FIELD

The present invention relates to an ink jet ink (hereinafter may also be referred to as "ink" merely), and an ink jet recording method, an ink cartridge, a recording unit and an ink jet recording apparatus using such an ink. In particular, the present invention relates to an ink preferably ejected from a recording head of which the surface having ejection orifices for ejecting an ink has been subjected to a water-repellency treatment, and containing a polymer.

BACKGROUND ART

Inks containing a polymer, and inks containing a polymer dispersion pigment with a pigment dispersed by a polymer are widely used as inks for improving the scratch resistance of a recorded article. However, when the ink containing the polymer is ejected from a recording head of which the surface having ejection orifices for ejecting an ink has been subjected to a water-repellent treatment, the ink has been liable to cause such a problem that curving of ink droplets occurs. As a means for solving this problem, it has been proposed to regulate contact angle with respect to a nozzle plate of a recording head (see Japanese Patent Application Laid-Open Nos. H09-194781 and 2000-290556). In addition, an ink containing a specific surfactant has also been proposed (see Japanese Patent Application Laid-Open No. 2005-008849).

DISCLOSURE OF THE INVENTION

The present inventors have also carried out an investigation as to polymer-containing inks with a view toward improving the scratch resistance of a recorded article. However, it has been found that when a polymer having a low acid value or a polymer having a high weight-average molecular weight is used as the polymer in an ink, stable ejection stability may not be achieved in some cases even when any method heretofore proposed is used. In addition, the same shall apply to the case where an ink high in the content of a polymer in the ink is ejected. In other words, when such a polymer-containing ink as described above is ejected according to an ink jet recording method, such a problem that curving of ink droplets occurs, and so deviation of ink-droplet impact point may occur in some cases.

It is accordingly an object of the present invention to provide an ink exhibiting such an excellent ejection property that when an ink containing a polymer capable of improving the scratch resistance of a recorded article is used, the deviation of the ink-droplet impact point on a recording medium is prevented. Another object of the present invention is to provide an ink jet recording method, an ink cartridge, a recording unit and an ink jet recording apparatus using the above-described ink.

The above objects can be achieved by the present invention described below. More specifically, the present invention provides an ink jet ink comprising a polymer and a surfactant, wherein an acid value of the polymer is from 100 mg KOH/g or more to 220 mg KOH/g or less, a weight-average molecular weight of the polymer is from 3,000 or more to 10,000 or less, and the surfactant has a structure represented by the following formula (1).

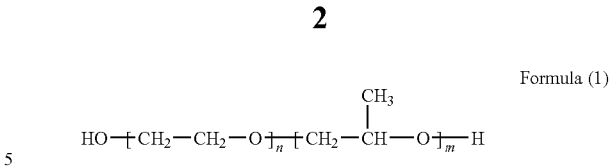

Formula (1)

In the formula (1), n is a numerical value of from 3 or more to 27 or less, and m is a numerical value of from 16 or more to 31 or less.

The present invention also provides an ink jet recording method having a step of conducting recording on a recording medium by ejecting an ink by an ink jet system, wherein the ink is the ink according to the present invention.

The present invention further provides an ink cartridge comprising an ink storage portion for storing ink, wherein the ink is the ink according to the present invention.

The present invention still further provide a recording unit comprising an ink storage portion for storing an ink and a recording head for ejecting the ink, wherein the ink is the ink according to the present invention.

The present invention yet still further provide an ink jet recording apparatus comprising an ink storage portion for storing an ink and a recording head for ejecting the ink, wherein the ink is the ink according to the present invention.

According to the present invention, there can be provided an ink containing a polymer which has excellent scratch resistance and such an excellent ejection property as not to cause the phenomenon that when an ink is ejected, curving of ink droplets occurs, and so deviation of the ink-droplet impact point is caused. According to another embodiment of the present invention, there can be provided an ink jet recording method, an ink cartridge, a recording unit and an ink jet recording apparatus using such an ink.

Further features of the present invention will become apparent from the following description of exemplary embodiments with reference to the attached drawings.

BEST MODE FOR CARRYING OUT THE INVENTION

Figure 1:
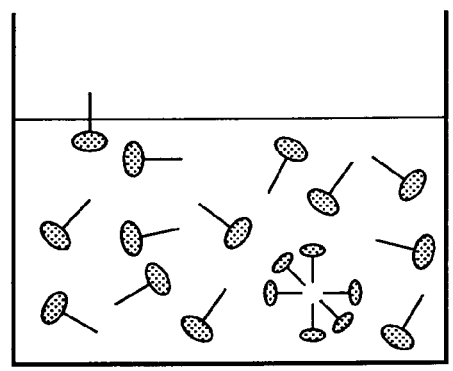
FIG. 1 is a model view illustrating a state just after an acetylene glycol type surfactant has been added to water.

The present invention will hereinafter be described in more detail with the best mode for carrying out the invention.

The present inventors have considered the cause of the phenomenon that deviation of the ink-droplet impact point on a recording medium is caused by the occurrence of curving of ink droplets ejected from ejection orifices. As a result, the present inventors have inferred that the main cause of the above-described phenomenon resides in the following respect. Namely, the present inventors have arrived at the conclusion that a polymer contained in an ink adheres to a face surface (a surface having ejection orifices for ejecting the ink), and the water repellency of the face surface is lowered (hereinafter may be referred to as "wettability is lowered" in some cases). Thus, the present inventors have simulated a phenomenon caused during the period from the time the ink adheres to the face surface to the time the water repellency of the face surface is lowered for the purpose of verifying the above inference. As a result, it has been revealed that the following phenomenon occurs on the face surface.

First, a majority of the ink adhered to the face surface is an ink in a form of fine mist generated in the vicinity of an face surface upon ejection and an ink rebounded off from a recording medium. This ink contains a polymer, and a part of the polymer orients to a gas-liquid interface or solid-liquid interface according to a change of an interfacial condition just at the time the ink has adhered to the face surface. At that time, the affinity between a hydrophobic unit of the polymer oriented to the solid-liquid interface and a hydrophobic unit making up the face surface subjected to the water-repellency treatment is high, so that this polymer may be difficult to be removed by a general cleaning operation for the face surface by a blade or wiper. The above phenomenon is repeated every time the ink is ejected, whereby the water repellency of the face surface is gradually lowered. As a result, a main ink droplet having high hydrophilicity is attracted to a portion of the face surface where the water repellency has been lowered, and so the phenomenon of occurrence of curving of the ink droplet is caused.

Taking the verified result into account, the present inventors have advanced the investigation mainly on how to prevent the polymer in the ink from adhering to the face surface, by modifying the properties of the ink, and not by changing the properties of the face surface nor by modifying the cleaning operation. As a result, the present inventors have considered that it is better to selectively orient other compounds than the polymer to a solid-liquid interface between the ink and the face surface before the polymer orients to the solid-liquid interface. The present inventors have considered that such devices can inhibit the polymer from adhering to the face surface irrespective of the properties (construction of the hydrophobic unit) of the face surface to achieve the objects of the present invention. Thus, the present inventors have provided several kinds of inks containing a compound having an orientation rate higher than the orientation rate of the polymer orienting to the gas-liquid interface or solid-liquid interface to carry out an investigation as to the relationship between the wettability of the face surface and the orientation rate. As a result, it has been revealed that even compounds having an orientation rate higher than the orientation rate of the polymer orienting to the gas-liquid interface or solid-liquid interface include effective compounds and ineffective ones.

Thus, the present inventors have carried out a further investigation. As a result, it has been found that the objects of the present invention can be achieved by providing an ink containing a surfactant having a structure represented by the following formula (1).

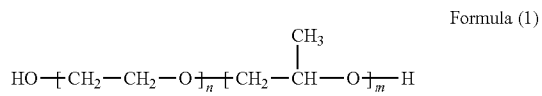

Formula (1)

In the formula (1), n is a numerical value of from 3 or more to 27 or less, and m is a numerical value of from 16 or more to 31 or less.

Incidentally, in the surfactant having the structure represented by the formula (1), [—$CH_2$—$OH_2$—O—] and [—$CH_2$—$CH(CH_3)$—O—] indicate an ethylene oxide unit and a propylene oxide unit, respectively. In the surfactant represented by the formula (1), the state of the ethylene oxide unit and the propylene oxide unit present in the structure thereof may be any state such as a random and block states. As a result of an investigation by the present inventors, however, it has been found that the state of block is preferred. It has been further found that a form in which the respective units are arranged in the state of block in the order of the ethylene oxide unit, propylene oxide unit and ethylene oxide unit as shown by the following formula (2) is particularly preferred.

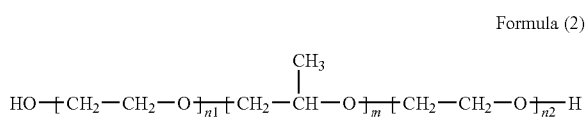

Formula (2)

In the formula (2), n1+n2 is a numerical value of from 3 or more to 27 or less, and m is a numerical value of from 16 or more to 31 or less.

Here, the condition where the units are present at random means that the arrangement of the ethylene oxide unit and propylene oxide unit is irregular. On the other hand, the condition where the units are present in the state of block means that a certain unit is made up of a unit of some monomers, and the arrangement of the unit made up of some monomers is regular.

The reason why the objects of the present invention cannot be achieved unless the compound having the specific structure described above is used even if the compound having the orientation rate higher than the orientation rate of the polymer orienting to the gas-liquid interface or solid-liquid interface is selected is not clearly known. However, the present inventors presume the reason to be as follows.

Figure 2:
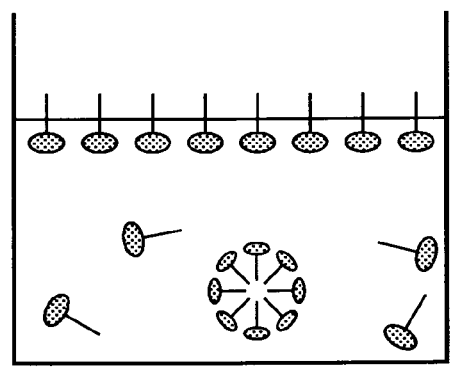
FIG. 2 is a model view illustrating a state after several seconds have elapsed from the time the acetylene glycol type surfactant was added to water.
Figure 3:
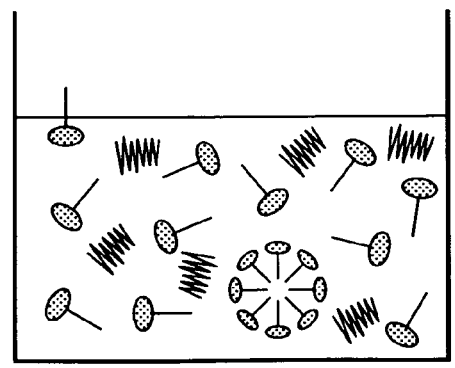
FIG. 3 is a model view illustrating a state just after the acetylene glycol type surfactant has been added to an aqueous solution of a polymer.
Figure 4:
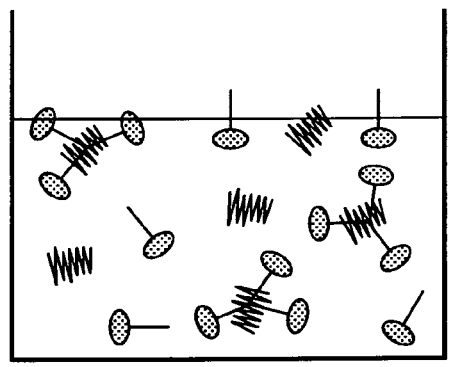
FIG. 4 is a model view illustrating a state after several seconds have elapsed from the time the acetylene glycol type surfactant was added to the aqueous solution of the polymer.

Representative examples of the compound having a high orientation rate include acetylene glycol type surfactants that are generally used as a surfactant for ink jet inks. However, according to the investigation by the present inventors, it has been unable to achieve the objects of the present invention even if the content of the acetylene glycol type surfactant in an ink is increased to any extent. The present inventors have presumed the reason for this to be as follows. First, in respect to an aqueous solution containing the acetylene glycol type surfactant alone, the acetylene glycol type surfactant certainly rapidly orients to the gas-liquid interface because of its high orientation rate (see FIGS. 1 and 2). In an aqueous solution of a polymer containing the acetylene glycol type surfactant, however, a hydrophobic unit of the acetylene glycol type surfactant is adsorbed on a hydrophobic unit of the polymer. Therefore, the acetylene glycol type surfactant becomes hard to orient to the gas-liquid interface, or such a phenomenon that the acetylene glycol type surfactant orients together with the polymer in while adsorbing on the polymer occurs (see FIGS. 3 and 4). As described above, in the case of the acetylene glycol type surfactant, a part of the polymer orients to the gas-liquid interface or solid-liquid interface, and so it is considered that the lowering of the wettability of the face surface cannot be inhibited.

Figure 5:
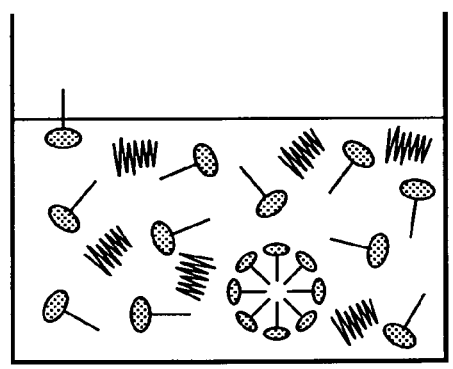
FIG. 5 is a model view illustrating a state just after a surfactant having a structure represented by the formula (1) has been added to the aqueous solution of the polymer.
Figure 6:
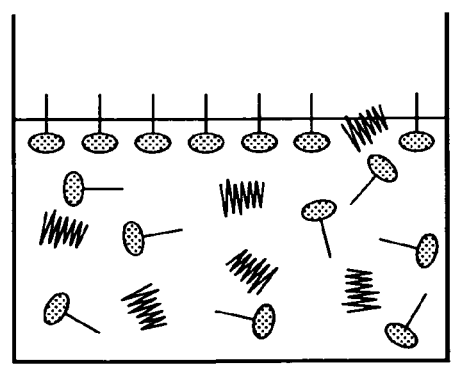
FIG. 6 is a model view illustrating a state after several seconds have elapsed from the time the surfactant having the structure represented by the formula (1) was added to the aqueous solution of the polymer.

On the other hand, in the case of the surfactant having the structure represented by the formula (1), the state of the ethylene oxide unit, which is a hydrophilic unit, and the propylene oxide unit, which is a hydrophobic unit, present in a molecular structure is as follows. Specifically, in the surfactant having the structure represented by the formula (1), the hydrophilic unit and hydrophobic unit are not clearly and separately present, unlike the acetylene glycol type surfactant. Therefore, the proportion thereof adsorbed on the polymer becomes extremely low compared with the acetylene glycol type surfactant, in which the hydrophilic unit and hydrophobic unit are regularly present even in the aqueous solution containing the polymer. Accordingly, in the case of the surfactant having the structure represented by the formula (1), the surfactant having the structure represented by the formula (1) comes to be selectively present at the gas-liquid interface (see FIGS. 5 and 6), and so it is considered that the lowering of the wettability of the face surface can be inhibited.

The phenomena shown in FIG. 1 to FIG. 6 can be confirmed by measuring the dynamic surface tension of each of the aqueous solutions.

According to a still further investigation by the present inventors, it has been found that the effect of the present invention may not be achieved in some cases depending on the number of the ethylene oxide units and propylene oxide units even in the surfactant having the structure represented by the formula (1). First, the case where the number of moles of the ethylene oxide unit is less than 3 (n<3) or the case where the number of moles of the propylene oxide unit is more than 31 (m>31) is mentioned. In such a case, the hydrophobicity of the surfactant becomes high, the surfactant becomes easy to be adsorbed on a polymer and a pigment in an ink, like the aqueous solution to which the acetylene glycol type surfactant alone is added. As a result, a part of the polymer orients to the gas-liquid interface and solid-liquid interface, so that it is considered that the lowering of the wettability of the face surface is not inhibited, and the level of ejection property required by the present inventors cannot be satisfied. On the other hand, in the case where the number of moles of the ethylene oxide unit is more than 27 (n>27) or the number of moles of the propylene oxide unit is less than 16 (m<16), the effect of the present invention is also not achieved. It is first considered that in the case of such a structure, the hydrophilicity of such a surfactant becomes high. Accordingly, in this case, the surfactant stably exists in the aqueous solution containing the polymer, so that the orientation rate and orientation quantity of the surfactant to the gas-liquid interface and solid-liquid interface are lowered. As a result, the amount of the polymer orienting to the gas-liquid interface and solid-liquid interface increases, so that it is considered that the lowering of the wettability of the face surface is not inhibited, and the level of ejection property required by the present inventors cannot be satisfied.

From the above-described reasons, it is inferred that when the polymer-containing ink further contains a surfactant having a structure represented by the following formula (1) of which the m and n values fall within the respective ranges defined by the present invention, the lowering of the wettability of the face surface is markedly inhibited.

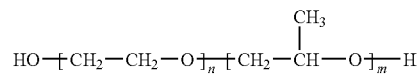

In the formula (1), n is a numerical value of from 3 or more to 27 or less, and m is a numerical value of from 16 or more to 31 or less.

In the present invention, for example, a commercially available compound may be used as the surfactant having the structure represented by the formula (1). The surfactant having the structure represented by the formula (1) generally exists as a mixture of compounds variously different in the number of ethylene oxide units and the number of propylene oxide units. As a result of the investigation by the present inventors, it has been confirmed that the effect of the present invention is achieved so far as the average values of the number of ethylene oxide units and the number of propylene oxide units fall within the respective ranges defined by the present invention. However, according to a further investigation by the present inventors, the level of ejection property required by the present inventors may not be satisfied in some cases according to the kind and amount of the polymer contained even in the ink containing the surfactant having the structure represented by the formula (1).

Thus, the present inventors have carried out a further investigation as to properties of the polymer contained in the ink. As a result, it has been found that when a polymer having an acid value of from 100 mg KOH/g or more to 220 mg KOH/g or less and a weight-average molecular weight of from 3,000 or more to 10,000 or less is used, the lowering of the wettability of the face surface can be more markedly inhibited. The effect by using the polymer having the above-described properties is not clearly known. However, the present inventors presume the reason for it to be as follows.

In the case of being outside the respective ranges defined above, i.e., the case where the weight-average molecular weight is less than 3,000, such a polymer is easy to orient to an interstice of the surfactant oriented to the gas-liquid interface. In this case, the orientation rate in the aqueous solution also becomes high, and so the polymer is easy to orient to the gas-liquid interface and solid-liquid interface, so that such a polymer is not optimum for inhibiting the lowering of the wettability of the face surface. Further, one of the objects of the present invention is to improve the scratch resistance of a recorded article. When the weight-average molecular weight of the polymer is less than 3,000, such an effect may not be sufficiently exhibited in some cases, so that such a polymer is not preferred even in this respect.

On the other hand, in the case of a polymer having a weight-average molecular weight higher than 10,000, it is considered that the polymer is easy to sterically spread in an aqueous solution. Therefore, the surfactant is easy to be trapped by the polymer when the surfactant orients to the gas-liquid interface or solid-liquid interface. As a result, the orientation quantity and orientation rate of the surfactant to the gas-liquid interface come to be lowered. In order to inhibit the lowering of the wettability of the face surface, it is thus not optimum for the ink to contain such a polymer.

In the case of a polymer having an acid value less than 100 mg KOH/g, the hydrophilicity of the polymer becomes high, and the polymer is easy to orient to the gas-liquid interface, so that such a polymer is not optimum for the purpose of inhibiting the lowering of the wettability. On the other hand, in the case of a polymer having an acid value more than 220 mg KOH/g, such a polymer is easy to penetrate together with liquid components in an ink into a recording medium after the ink is applied to the recording medium. Therefore, it may be impossible in some cases to improve the scratch resistance of a recorded article, which is one of the objects of the present invention, and so such a polymer is not preferred.

It is objects of the present invention to improve the scratch resistance of the resulting recorded article and inhibit the phenomenon that the curving of an ink occurs to cause deviation of the ink-droplet impact point, even when the ink is ejected by means of an ink jet recording method. From the result of the investigation as to the polymers, the present inventors have arrived at the conclusion that it is important for the ink to have the following constitution for achieving these objects. In other words, it is important to provide an ink containing the polymer having an acid value of from 100 mg KOH/g or more to 220 mg KOH/g or less and a weight-average molecular weight of from 3,000 or more to 10,000 or less and the surfactant having the structure represented by the formula (1).

Incidentally, as a result of a further investigation by the present inventors, it has been found that the following conditions are preferable to provide a better ink. First, assuming that the content (% by mass) of the polymer is A % by mass based on the total mass of the ink, and the content (% by mass) of the surfactant is B % by mass. At this time, it has been found that the dynamic surface tension of an aqueous solution containing B % by mass of the surfactant alone is favorably lower than the dynamic surface tension of an aqueous solution containing A % by mass of the polymer alone. In the case of such constitution, the effect of the present invention can be more markedly achieved.

In the present invention, the content (% by mass) of the polymer is favorably 2.5% by mass or more based on the total mass of the ink for the purpose of more improving the scratch resistance of the recorded article. Further, the content (% by mass) of the polymer is favorably less than 3.5% by mass based on the total mass of the ink for the purpose of reducing the amount of the polymer adhered to the face surface. In addition, the content (% by mass) of the surfactant having the structure represented by the formula (1) is favorably from 0.05% by mass or more to 0.5% by mass or less, more favorably from 0.10% by mass or more to 0.35% by mass or less based on the total mass of the ink.

The polymer used in the ink is further favorably a block copolymer for the following reason. In a block copolymer, a hydrophilic unit and a hydrophobic unit are clearly separately present in the structure thereof, so that the block copolymer is easier to form an associated product in the ink than a random copolymer, and so the block copolymer is hard to orient to the gas-liquid interface and solid-liquid interface. Incidentally, in the present invention, the condition that the polymer is a block copolymer means that one or more of monomers (hydrophilic monomers or hydrophobic monomers) are respectively arranged continuously.

Further, it is considered that upon adhering of the ink to the face surface, it is better for the surfactant in the ink to orient to the face surface as soon as possible for the purpose of more effectively inhibiting the lowering of the wettability of the face surface when the ink is ejected over a long period of time. Form this point of view, the present inventors have carried out such an investigation as described below.

First, a number of inks which were different in the property of dynamic surface tension at a certain lifetime were prepared by using various surfactants having the structure represented by the formula (1), which are used in the present invention. These inks were used to observe the condition of the face surface in the case where the ink was ejected over a long period of time, and the relationship between the wettability of the face surface and the dynamic surface tension of the ink at lifetimes of from 10 milliseconds to 5,000 milliseconds was investigated. As a result, it has been found that when various surfactants having the structure represented by the formula (1), which are used in the present invention, are used, the correlation between the wettability of the face surface and the dynamic surface tension of the ink at a lifetime of 50 milliseconds is the greatest irrespective of the construction of the face surface. It has also been found that this correlation becomes continuously decreased as the lifetime gets farther from the lifetime of 50 milliseconds upward and downward. From this fact, the present inventors have found that an ink capable of particularly markedly inhibiting the lowering of the wettability of the face surface can be provided by defining the dynamic surface tension of the ink at the lifetime of 50 milliseconds within a certain range.

Specifically, it has been found favorable that the dynamic surface tension at the lifetime of 50 milliseconds determined by a maximum bubble pressure method is 50 mN/m or less, as the property of the ink. Incidentally, at this time, it is necessary that the main factor by which the ink exhibits the above property is attributable to the surfactant having the structure represented by the formula (1). In other words, the mechanism with which the effect of the present invention is achieved is as described above, and thus the effect obtained by controlling the dynamic surface tension of the ink cannot be achieved even if the above property is exhibited owing to any other surfactant or a penetrable solvent such as an alkanediol or glycol ether. In order for the ink according to the present invention to exhibit the property of dynamic surface tension, the property can be achieved by using the surfactant having the structure represented by the formula (1) and controlling the content (% by mass) thereof within a range of, for example, from 0.10% by mass or more to 0.35% by mass or less based on the total mass of the ink. Incidentally, no particular limitation is imposed on the lower limit of the dynamic surface tension at the lifetime of 50 milliseconds. However, the lower limit value is favorably 30 mN/m or more for securing the image density and inhibiting strike-through of the ink.

The maximum bubble pressure method used in the measurement of the dynamic surface tension of the ink in the present invention will now be described. The maximum bubble pressure method is a method in which a maximum pressure required to release a bubble formed at a tip portion of a probe (capillary) dipped in a liquid to be measured is measured, and then the surface tension is found from this maximum pressure. The lifetime means a time period from a point of time a surface of a new bubble is formed after a bubble is released from the tip portion to a point of time a maximum bubble pressure is obtained (a point of time the curvature radius of the bubble becomes equal to the radius of the tip portion of the probe), upon the formation of the bubble at the tip portion of the probe in the maximum bubble pressure method.

The surfactant having the structure represented by the formula (1) is obtained by adding an ethylene oxide unit and a propylene oxide unit. The surfactant is favorably prepared in the following manner. The content of water in a reaction system is first controlled to 0.3% by mass or less. The added amount of a basic catalyst such as sodium hydroxide or a magnesium oxide-aluminum solid catalyst used as a catalyst is always kept to 0.25% by mass or less based on an intermediate product in an addition step of each alkylene oxide and a final product. The total content of the following components contained as by-products in the resulting product is controlled within the following range. In other words, the content of polyethylene glycol, polypropylene glycol, and polyalkylene glycol which is a polymerized product of an ethylene oxide unit and a propylene oxide unit is controlled within a range of from about 0.3% by mass or more to about 3% by mass or less.

<Aqueous Medium>

In the ink according to the present invention, an aqueous medium containing water or water and a water-soluble organic solvent may be used as another component of the ink. The content (% by mass) of the water-soluble organic solvent in the ink is favorably from 3.0% by mass or more to 50.0% by mass or less based on the total mass of the ink. As the water-soluble organic solvent, may be specifically used the following solvent: alkanols having 1 to 4 carbon atoms, such as ethanol, isopropanol, n-butanol, isobutanol, sec-butanol and tert-butanol; carboxylic acid amides such as N,N-dimethylformamide and N,N-dimethylacetamide; ketones or keto-alcohols such as acetone, methyl ethyl ketone and 2-methyl-2-hydroxypentan-4-on; cyclic ethers such tetrahydrofuran and dioxane; glycols such as glycerol, ethylene glycol, diethylene glycol, triethylene glycol, tetraethylene glycol, 1,2- or 1,3-propylene glycol, 1,2- or 1,4-butylene glycol and dithioglycol; polyhydric alcohols such as 1,5-pentanediol, 1,2- or 1,6-hexanediol, 1,2,6-hexanetriol and polyethylene glycol having an average molecular weight of 200, 400, 600, 1,000 or 2,000; heterocyclic compounds such as 2-pyrrolidone, N-methyl-2-pyrrolidone, 1,3-dimethyl-2-imidazolidinone and N-methylmorpholine; sulfur-containing compounds such as dimethyl sulfoxide; and saccharides such as glucose and galactose. These water-soluble organic solvents may be used either singly or in any combination thereof.

Incidentally, water-soluble organic solvents such as aklanediols and glycol ethers as mentioned below are generally used as water-soluble organic solvents used in inks. Specific examples of the alkanediols include 1,3-butanediol, 1,5-pentanediol and 1,2- or 1,6-hexanediol. Specific examples of the glycol ethers include diethylene glycol monomethyl (or ethyl)ether and triethylene glycol monoethyl (or butyl)ether. However, penetrable water-soluble organic solvents such as alkanediols and glycol ethers may be low in initial dynamic surface tension in some cases compared with the surfactant contained in the ink. When the water-soluble organic solvent lower in dynamic surface tension than the surfactant is used, the orientation rate of the surfactant to the gas-liquid interface may become low in some cases. Therefore, it is favorable that the penetrable water-soluble organic solvent such as the alkanediol or glycol ether is not used as the water-soluble organic solvent as much as possible, or if such solvent is used, a composition is so arranged that an effect of adding such a solvent is obtained, and the effect of the present invention is not impaired.

Deionized water is favorably used as water. The content (% by mass) of water in the ink is favorably from 50.0% by mass or more to 95.0% by mass or less based on the total mass of the ink.

<Coloring Material>

Coloring materials usable in the ink according to the present invention are favorably water-insoluble coloring materials (hereinafter may be referred to as "pigments" merely) such as carbon black and organic pigments. Any pigment may be used irrespective of the dispersing system thereof. For example a pigment of the polymer dispersion type using a dispersant (polymer dispersion pigment) or a pigment capable of being dispersed without using any dispersant by enhancing the dispersibility of the water-insoluble coloring material itself may be used. For example, a microcapsule type pigment, a self-dispersing type pigment (self-dispersion pigment) into the surfaces of particles of which a hydrophilic group is introduced, or a pigment to the surfaces of particles of which a polymer-containing organic group is chemically bonded (polymer-bonded type self-dispersion pigment) may be used. Needless to say, these pigments different from one another in dispersing system may also be used in combination. The content (% by mass) of the water-insoluble coloring material in the ink is favorably from 0.1% by mass or more to 15.0% by mass or less, more favorably from 1.0% by mass to 10.0% by mass based on the total mass of the ink.

[Carbon Black]

A pigment used in a black ink is favorably carbon black. Examples of usable carbon black include furnace black, lamp black, acetylene black and channel black. As the carbon black, may be specifically used the following carbon black: Raven: 1170, 1190 ULTRA-II, 1200, 1255, 1250, 1500, 2000, 3500, 5000, 5250, 5750 and 7000 (all, products of Columbian Carbon Co.); Black Pearls L, Regal: 300R, 400R and 660R, Mogul L, Monarch: 700, 800, 880, 900, 1000, 1100, 1300 and 1400, and Valcan XC-72R (all, products of CABOT CO.); Color Black: FW1, FW2, FW2V, FW18, FW200, 5150, 5160 and 5170, Printex: 35, U, V, 140U and 140V, and Special Black: 4, 4A, 5 and 6 (all, products of Degussa AG); and No. 25, No. 33, No. 40, No. 47, No. 52, No. 900, No. 2300, MCF-88, MA7, MA8, MA100 and MA600 (all, products of MITSUBISHI CHEMICAL CORPORATION). Besides the above pigments, carbon black newly prepared for the present invention, magnetic fine particles such as magnetite and ferrite, and titanium black may also be used.

[Organic Pigment]

Pigments used in color inks are favorably organic pigments. As the organic pigments, may be used the following pigments:
water-insoluble azo pigments such as Toluidine Red, Toluidine Maroon, Hansa Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; Flavanthrone Yellow; Acylamide Yellow; Quinophthalone Yellow; Nickel Azo Yellow; Copper Azomethine Yellow; Perinone Orange; Anthrone Orange; Dianthraquinonyl Red; and Dioxazine Violet.

When organic pigments are indicated by COLOR INDEX (C.I.) numbers, the following pigments may be specifically used.

C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180 and 185; C.I. Pigment Orange: 16, 36, 43, 51, 55, 59, 61 and 71; C.I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, 254, 255 and 272; C.I. Pigment Violet: 19, 23, 29, 30, 37, 40 and 50; C.I. Pigment Blue: 15, 15:3, 15:4, 15:6, 22, 60 and 64; C.I. Pigment Green: 7 and 36; and C.I. Pigment Brown 23, 25 and 26.

[Dispersant]

When a polymer dispersant is used as a dispersant for dispersing the above-described water-insoluble coloring material in the ink, a polymer having the properties as described above may be used. In other words, it is necessary in the present invention to contain a polymer having an acid value of from 100 mg KOH/g or more to 220 mg KOH/g or less and a weight-average molecular weight of from 3,000 or more to 10,000 or less. An ink obtained by dispersing the pigment in an aqueous medium making up the ink by the polymer having such properties is more preferred. As the dispersant, may be specifically used any one of copolymers obtained by copolymerizing the following monomers:
Styrene, styrene derivatives, vinylnaphthalene, vinylnaphthalene derivatives, aliphatic alcohol esters of α,β-ethylenically unsaturated carboxylic acids, acrylic acid, acrylic acid derivatives, maleic acid, maleic acid derivatives, itaconic acid, itaconic acid derivatives, fumaric acid and fumaric acid derivatives, vinylpyrrolidone, acrylamide, and acrylamide derivatives. Examples of the copolymers include block copolymers, random copolymers and graft copolymers formed of at least two monomers (with the proviso that at least one thereof is a hydrophilic monomer) selected from these monomers, and salts thereof. The polymers formed of these monomers are soluble in an aqueous solution containing a base dissolved therein and are alkali-soluble polymers. In the present invention, the polymer particularly favorably contains acrylic acid or a derivative thereof as a hydrophilic monomer because a polymer having moderate hydrophilicity can be provided, and the acid value of the polymer can be easily adjusted.

The mass ratio of the hydrophilic monomer to the hydrophobic monomer (hydrophilic monomer/hydrophobic monomer) in the monomers making up the polymer is favorably from 60/40 to 30/70, i.e., from 0.4 to 1.5. Incidentally, in the present invention, monomers corresponding to hydrophobic monomers among the monomers mentioned above include styrene, styrene derivatives, vinylnaphthalene and vinylnaphthalene derivatives, and other monomers than these monomers correspond to hydrophilic monomers.

Incidentally, into the ink according to the present invention, another polymer than the polymer for dispersing the pigment may be further added for improving the scratch resistance of the recorded article. The polymer added into the ink at this time may be the same as or different from the polymer used as the dispersant. However, the same polymer as the polymer used as the dispersant is particularly favorably added into the ink from the viewpoint of stability of the ink.

(Other Additives)

The ink according to the present invention may contain a solid moisture-retaining compound such as urea, a urea derivative, trimethylolpropane or trimethylolethane for the purpose of maintaining the moisture retention ability of the ink. The content (% by mass) of the moisture-retaining compound in the ink is favorably from 0.1% by mass or more to 20.0% by mass or less, more favorably from 3.0% by mass or more to 10.0% by mass or less based on the total mass of the ink.

In addition to the above-described components, the ink according to the present invention may contain various additives such as a pH adjustor, a rust preventive, a preservative, a mildewproofing agent, an antioxidant and an anti-reducing agent as needed. An ink containing another surfactant than the surfactant having the structure represented by the formula (1) may also be provided.

<Ink Jet Recording Method, Ink Cartridge, Recording Unit and Ink Jet Recording Apparatus>

Figure 7:
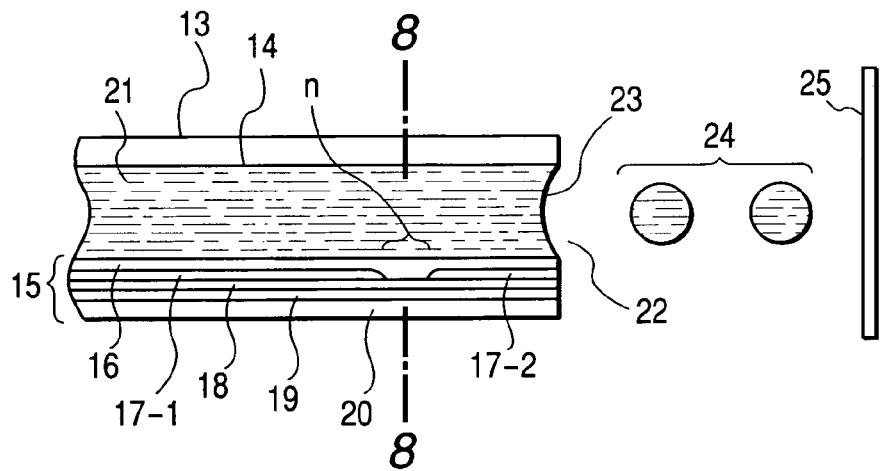
FIG. 7 is a longitudinal cross-sectional view illustrating a recording head.
Figure 8:
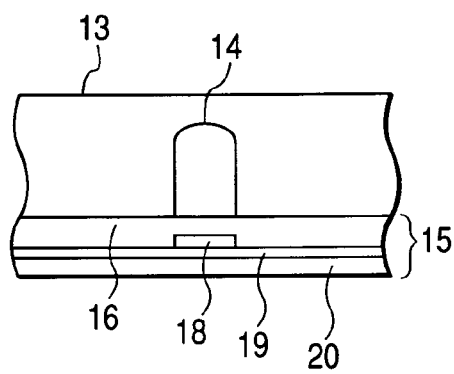
FIG. 8 is a transverse cross-sectional view of the recording head.

An exemplary ink jet recording apparatus will hereinafter be described. First of all, an exemplary construction of a recording head, which is a principal part of the ink jet recording apparatus making good use of thermal energy, is illustrated in FIG. 7 and FIG. 8. FIG. 7 is a cross-sectional view of a recording head 13 taken along the flow path of an ink, and FIG. 8 is a cross-sectional view taken along line 8-8 in FIG. 7. The recording head 13 is obtained by bonding a glass, ceramic, silicon or plastic plate having a flow path (nozzle) 14, through which the ink is passed, to a heating element substrate 15.

The heating element substrate 15 is constructed by a protective layer 16, electrodes 17-1 and 17-2, a heating resistor layer 18, a heat accumulating layer 19 and a substrate 20. The protective layer 16 is formed with silicon oxide, silicon nitride or silicon carbide. The electrodes 17-1 and 17-2 are formed with aluminum, gold or aluminum-copper alloy. The heating resistor layer 18 is formed with a high-melting material such as $HfB_2$, TaN or TaAl. The heat accumulating layer 19 is formed with thermally oxidized silicon or aluminum oxide. The substrate 20 is formed with a material having good heat radiating property, such as silicon, aluminum or aluminum nitride.

When pulsed electric signals are applied to the electrodes 17-1 and 17-2 of the recording head 13, the heating element substrate 15 rapidly generates heat at the region shown by 'n' to generate bubbles in an ink 21, which is in contact with this region. A meniscus 23 of the ink is projected by the pressure of the bubbles, and the ink 21 is ejected through the nozzle 14 of the recording head to fly out of an ejection orifice 22 toward a recording medium 25 in the form of ink droplets 24.

Figure 9:
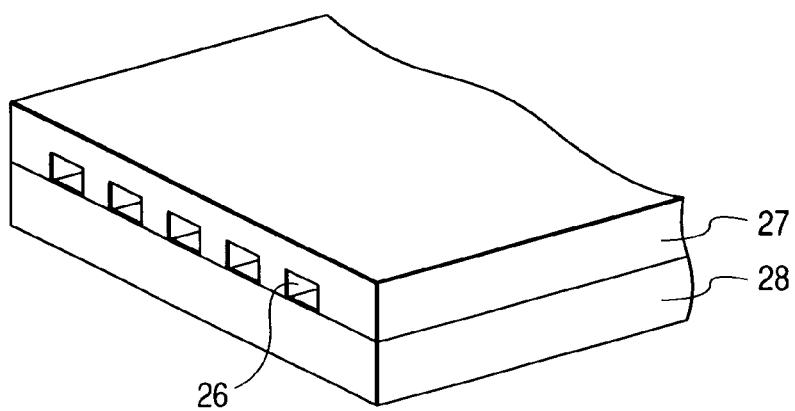
FIG. 9 is a perspective view illustrating the appearance of a multi-recording head composed of an array of a number of recording heads as illustrated in FIG. 7.

FIG. 9 illustrates an appearance of a multi-head composed of an array of a number of heads as illustrated in FIG. 7. The multi-head is formed by bonding a glass plate 27 having a number of nozzles 26 to a heating head 28 similar to that described in FIG. 7.

Figure 10:
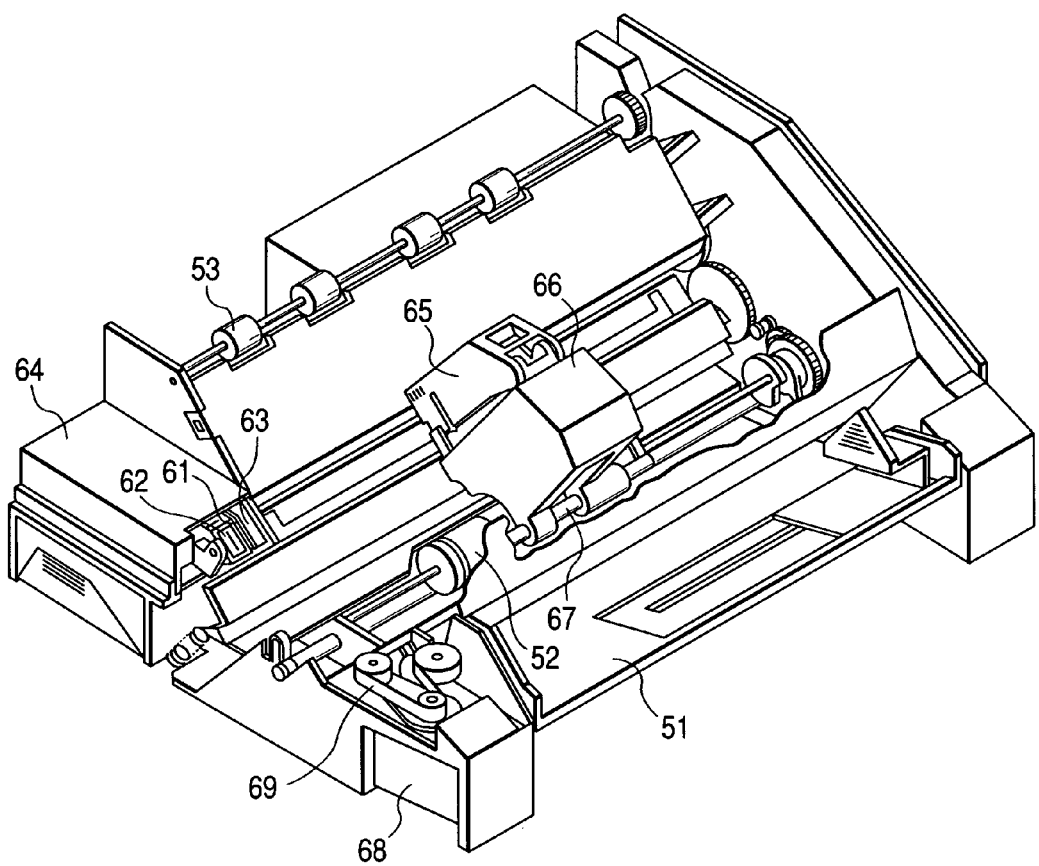
FIG. 10 is a perspective view illustrating an exemplary ink jet recording apparatus.

FIG. 10 illustrates an example of an ink jet recording apparatus in which this recording head has been incorporated. In FIG. 10, one end of a blade 61 that is a wiping member is held and fixed by a blade-holding member to form a cantilever. The blade 61 is arranged at a position adjacent to a recording region, in which the recording head 65 operates, and in the illustrated embodiment, is held in a form protruding into the course through which the recording head 65 is moved. A cap 62 for the face of ejection openings of the recording head 65 is arranged at a home position adjacent to the blade 61 and is so constructed that it moves in a direction perpendicular to a direction in which the recording head 65 is moved, and comes into contact with the face of the ejection openings to cap it.

An ink absorbing member 63 is provided adjoiningly to the blade 61 and, similar to the blade 61, held in a form protruding into the course through which the recording head 65 is moved. An ejection-recovery portion 64 is constructed by the blade 61, cap 62 and an ink absorbing member 63. Water, dust and/or the like are removed from the face of the ink-ejecting openings by the blade 61 and the ink absorbing member 63. The recording head 65 has an ejection-energy-generating unit and serves to eject the ink on a recording medium set in an opposing relation to the ejection opening face provided with the ejection openings to conduct recording. A carriage 66 mounts the recording head 65 thereon to move the recording head 65. The carriage 66 is slidably interlocked with a guide shaft 67 and connected (not illustrated) at its part to a belt 69 driven by a motor 68. Thus, the carriage 66 can be moved along the guide shaft 67 and hence, the recording head 65 can be moved from a recording region to a region adjacent thereto.

A feeding part 51, from which the recording medium is inserted, and feed rollers 52 driven by a motor (not illustrated) are provided. With such a construction, the recording medium is fed to the position opposite to the ejection opening face of the recording head 65, and discharged from a discharge section provided with discharge rollers 53 with the progress of recording. In the above construction, the cap 62 in the ejection-recovery portion 64 is receded from the path of motion of the recording head 65 when the recording head 65 is returned to its home position after completion of recording by the recording head 65, and the blade 61 remains protruded into the path of motion. As a result, the ejection opening of the recording head 65 is wiped.

Incidentally, when the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which the recording head is moved to the home position adjacent to each recording region at given intervals, where the ejection opening face is wiped in accordance with this movement.

Figure 11:
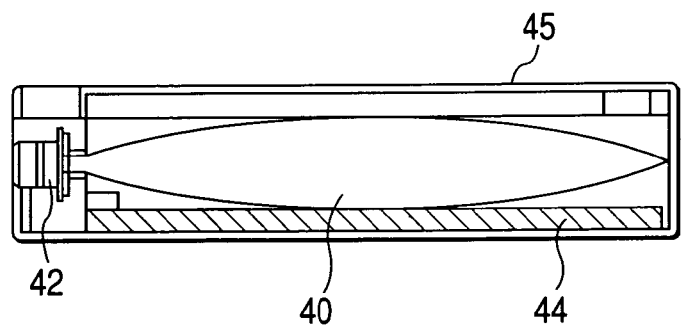
FIG. 11 is a longitudinal cross-sectional view illustrating an ink cartridge.

FIG. 11 illustrates an exemplary ink cartridge in which an ink to be fed to a recording head through an ink feeding member, for example, a tube has been stored. In the ink cartridge, an ink storage portion 40 for storing the ink to be fed is formed by, for example, a bag for the ink. One end thereof is provided with a stopper 42 made of rubber. A needle (not illustrated) may be inserted into this stopper 42 so that the ink in the bag 40 for the ink can be fed to the recording head. An ink absorbing member 44 is provided for receiving a waste ink.

Figure 12:
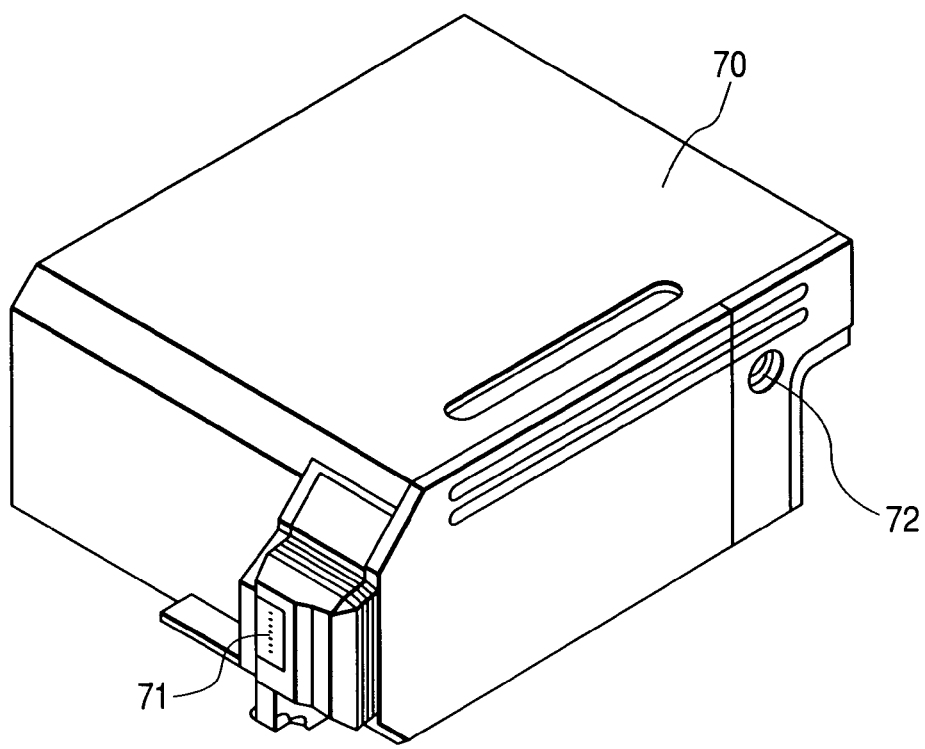
FIG. 12 is a perspective view illustrating an exemplary recording unit.

The ink jet recording apparatus are not limited to the apparatus in which the recording head and the ink cartridge are separately provided as described above. Therefore, an apparatus in which the recording head and the ink cartridge are integrally formed as shown in FIG. 12 may also be favorably used. In FIG. 12, an ink storage portion for storing an ink, for example, an ink absorbing member, is housed in a recording unit 70. The recording unit 70 is so constructed that the ink in such an ink-absorbing member is ejected in the form of ink droplets through a recording head portion 71 having a plurality of ejection openings. The ink storage portion may also be constructed by a bag for the ink, in the interior of which a spring is provided, without using the ink absorbing member. An air passage 72 is provided for communicating the interior of the cartridge with the atmosphere. This recording unit 70 is used in place of the recording head 65 illustrated in FIG. 10, and is detachably installed on the carriage 66.

Figure 13:
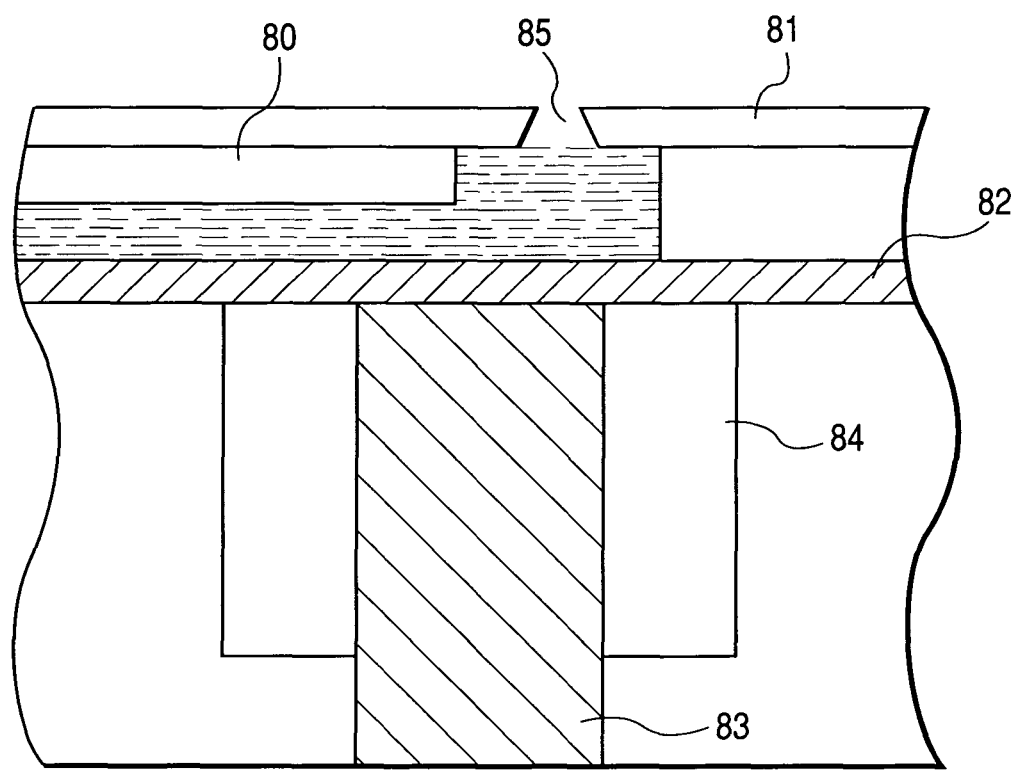
FIG. 13 illustrates the construction of an exemplary recording head.

Favorable examples of ink jet systems and ink jet recording apparatus making good use of mechanical energy include that having an On-Demand type ink jet recording head of the following construction. Specifically, the ink jet recording apparatus has a nozzle-forming substrate having a plurality of nozzles and pressure-generating devices constructed by a piezoelectric material and an electric conductive material and arranged in an opposing relation to the nozzles. The apparatus is equipped with an ink filled around the pressure-generating devices and ejects the ink from the nozzles by displacing the pressure-generating devices by application of a voltage. FIG. 13 illustrates an exemplary construction of a recording head, which is a principal part of the above-described ink jet recording apparatus.

The recording head is constructed by an ink flow path 80, an orifice plate 81, a vibration plate 82, a piezoelectric element 83, and a substrate 84 for supporting and fixing the orifice plate 81, the vibration plate 82 and the like thereon. An ink is ejected as ink droplets having a desired volume through the orifice plate 81 from the ink flow path 80 communicating with an ink chamber (not illustrated). At this time, the ink is ejected by the action of the vibration plate 82 for applying a pressure and the piezoelectric element 83 bonded to the vibration plate 82 and displaced by an electric signal. The ink flow path 80 is formed with a photosensitive resin. In the orifice plate 81, an ejection opening 85 is formed by subjecting a metal such as stainless steel or nickel to electroforming or punching by press working. The vibration plate 82 is formed with a film of a metal such as stainless steel, nickel or titanium and a high-modulus resin film.

The piezoelectric element 83 is formed with a dielectric material such as barium titanate or PZT. The recording head with such construction as described above generates strain stress by applying a pulsed voltage to the piezoelectric element 83. The vibration plate bonded to the piezoelectric element 83 is deformed by the energy of the stress, and the ink in the ink flow path 80 is thus perpendicularly pressurized to eject ink droplets (not illustrated) from the ejection opening 85 of the orifice plate 81, thereby conducting recording. Such a recording head can be used by incorporating it into an ink jet recording apparatus similar to the apparatus illustrated in FIG. 10. Operation of details of the ink jet recording apparatus may be made in the same manner as described above.

EXAMPLES

The present invention will hereinafter be described more specifically by the following Examples and Comparative Examples. However, the present invention is not limited by the following examples so far as the subject matter of the present invention is not overstepped. Incidentally, all designations of "part" or "parts" and "%" as will be used in the following examples mean part or parts by mass and % by mass unless expressly noted.

[Preparation of Pigment Dispersion Solutions 1 to 13]

Ten parts of carbon black, six parts of glycerol, ten parts of a styrene-methyl acrylate-acrylic acid terpolymer and 74 parts of water were dispersed for 5 hours at 1,500 rpm by means of a sand mill (manufactured by KANEDA SCIEN- TIFIC CO., LTD) to obtain a dispersion. Incidentally, a carbon black having a specific surface area of 220 m²/g and a DBP oil absorption of 130 ml/100 g was used. The styrene-methyl acrylate-acrylic acid terpolymer used as a dispersant is a random terpolymer having a copolymerization (mass) ratio of 61:26:13, a weight-average molecular weight of 3,000 and an acid value of 100 mg KOH/g. For the styrene-methyl acrylate-acrylic acid terpolymer, an aqueous solution obtained by adding water and potassium hydroxide equivalent to the acid value of the terpolymer in advance and stirring them at 80° C. was used. Zirconia beads having a diameter of 0.6 mm were used for the sand mill, and the packing rate in a pot was determined to be 70%. The dispersion solution obtained above was further centrifuged for 10 minutes at 5,000 rpm to remove aggregated components. Thereafter, the dispersion solution was adjusted so as to give a pigment concentration of 10% and a polymer concentration of 3%, thereby obtaining a pigment dispersion solution 1.

Pigment dispersion solutions 2 to 13 were prepared in the same manner except that the styrene-methyl acrylate-acrylic acid terpolymer was respectively changed to those shown in Table 1, and adjusted so as to give a pigment concentration of 10% and a polymer concentration of 3%. The copolymerization (mass) ratio (styrene:methyl acrylate:acrylic acid), weight-average molecular weight, acid value and type of the styrene-methyl acrylate-acrylic acid terpolymer used in the preparation of each pigment dispersion solution are shown in Table 1.

TABLE 1

Styrene-methyl acrylate-acrylic acid terpolymer

| | | Copolymerization ratio | Weight-average molecular weight | Acid value [mg KOH/g] | Type of terpolymer |
|---|---|---|---|---|---|
| Pigment dispersion solution | 1 | 61:26:13 | 3,000 | 100 | Random |
| | 2 | 55:32:13 | 10,000 | 100 | Random |
| | 3 | 42:30:28 | 3,000 | 220 | Random |
| | 4 | 39:34:27 | 10,000 | 220 | Random |
| | 5 | 42:30:28 | 3,000 | 220 | Block |
| | 6 | 70:18:12 | 3,000 | 90 | Random |
| | 7 | 68:21:11 | 10,000 | 90 | Random |
| | 8 | 42:28:30 | 3,000 | 230 | Random |
| | 9 | 47:21:32 | 10,000 | 230 | Random |
| | 10 | 58:30:12 | 2,000 | 100 | Random |
| | 11 | 63:24:13 | 11,000 | 100 | Random |
| | 12 | 43:28:29 | 2,000 | 220 | Random |
| | 13 | 48:24:28 | 11,000 | 220 | Random |

[Preparation of Ink]

After the components shown in Table 2 and Table 3 were mixed and sufficiently stirred, the resultant respective mixtures were filtered under pressure through a polypropylene filter (product of PALL) having a pore size of 1.2 µm, thereby preparing inks according to Examples 1 to 14 and Comparative Examples 1 to 17. Incidentally, the styrene-methyl acrylate-acrylic acid terpolymers shown in Table 2 and Table 3 are the same as the styrene-methyl acrylate-acrylic acid terpolymers in the respective pigment dispersion solutions used for the respective inks.

The kind of the polymer in the ink and the content thereof are described taking the ink of Example 1 as an example. Since the pigment dispersion solution 1 is used in the ink of Example 1, the copolymerization ratio of the styrene-methyl acrylate-acrylic acid terpolymer added into the ink is 61:26:13, the weight-average molecular weight is 3,000, the acid value is 100 mg KOH/g, and the type of the terpolymer is random. At this time, the ink contains 40.00% of the pigment dispersion solution 1 having a polymer concentration of 3% and 1.30% of the styrene-methyl acrylate-acrylic acid terpolymer. Accordingly, the content of the styrene-methyl acrylate-acrylic acid terpolymer in the ink is 2.50% as determined from the following equation. 40.00%×3/100 (polymer in the pigment dispersion solution)+1.30% (polymer added to the ink)=2.50%

TABLE 2

Composition of ink

| | | | | | | (unit: %) |
|---|---|---|---|---|---|---|
| | | Ex. 1 | Ex. 2 | Ex. 3 | Ex. 4 | Ex. 5 |
| Pigment dispersion solution | 1 | 40.00 | — | — | — | — |
| | 2 | — | 40.00 | — | — | — |
| | 3 | — | — | 40.00 | — | — |
| | 4 | — | — | — | 40.00 | — |
| | 5 | — | — | — | — | 40.00 |
| Surfactant of formula (1) | n = 3.4 m = 16.4 (*1) | 0.35 | 0.35 | 0.35 | 0.35 | 0.35 |
| Glycerol | | 15.00 | 15.00 | 15.00 | 15.00 | 15.00 |
| 1,2-Hexanediol | | — | — | — | — | — |
| Polyethylene glycol (*7) | | 5.00 | 5.00 | 5.00 | 5.00 | 5.00 |
| Acetylenol EH (*8) | | 0.10 | 0.10 | 0.10 | 0.10 | 0.10 |
| Styrene-methyl acrylate-acrylic acid terpolymer | | 1.30 | 1.30 | 1.30 | 1.30 | 1.30 |
| Pure water | | 38.25 | 38.25 | 38.25 | 38.25 | 38.25 |

| | | | | | | (unit: %) |
|---|---|---|---|---|---|---|
| | | Ex. 6 | Ex. 7 | Ex. 8 | Ex. 9 | Ex. 10 |
| Pigment dispersion solution | 1 | 40.00 | 40.00 | 40.00 | — | — |
| | 5 | — | — | — | 40.00 | 40.00 |
| Surfactant of formula (1) | n = 3.4 m = 16.4 (*1) | — | — | — | 0.35 | 0.35 |
| | n = 14.4 m = 16.4 (*2) | 0.35 | — | — | — | — |
| | n = 5.7 m = 30.2 (*3) | — | 0.35 | — | — | — |
| | n = 26.1 m = 30.2 (*4) | — | — | 0.35 | — | — |
| Glycerol | | 15.00 | 15.00 | 15.00 | 15.00 | 15.00 |
| 1,2-Hexanediol | | — | — | — | — | — |
| Polyethylene glycol (*7) | | 5.00 | 5.00 | 5.00 | 5.00 | 5.00 |
| Acetylenol EH (*8) | | 0.10 | 0.10 | 0.10 | 0.10 | 0.10 |
| Styrene-methyl acrylate-acrylic acid terpolymer | | 1.30 | 1.30 | 1.30 | 1.80 | 2.30 |
| Pure water | | 38.25 | 38.25 | 38.25 | 37.75 | 37.25 |

| | | | | | (unit: %) |
|---|---|---|---|---|---|
| | | Ex. 11 | Ex. 12 | Ex. 13 | Ex. 14 |
| Pigment dispersion solution | 1 | 40.00 | 40.00 | 40.00 | — |
| | 5 | — | — | — | 40.00 |
| Surfactant of formula (1) | n = 3.4 m = 16.4 (*1) | 0.35 | 0.35 | 0.10 | 0.35 |
| Glycerol | | 15.00 | 15.00 | 15.00 | 15.00 |
| 1,2-Hexanediol | | — | 5.00 | — | — |
| Polyethylene glycol (*7) | | 5.00 | 5.00 | 5.00 | 5.00 |
| Acetylenol EH (*8) | | 0.10 | 0.10 | 0.10 | 0.10 |
| Styrene-methyl acrylate-acrylic acid terpolymer | | 0.80 | 1.30 | 1.30 | 2.20 |
| Pure water | | 38.75 | 33.25 | 38.50 | 37.35 |

(*1) Trade name: Adeka Pluronic L31; product of ADEKA CORPORATION;
(*2) Trade name: Adeka Pluronic L34; product of ADEKA CORPORATION;
(*3) Trade name: Adeka Pluronic L61; product of ADEKA CORPORATION;
(*4) Trade name: Adeka Pluronic L64; product of ADEKA CORPORATION;
(*7) Average molecular weight: 600;
(*8) Product of Kawaken Fine Chemicals Co., Ltd.

TABLE 3

| Composition of ink | | | | | | | |
|---|---|---|---|---|---|---|---|
| | | Comp. Ex. 1 | Comp. Ex. 2 | Comp. Ex. 3 | Comp. Ex. 4 | Comp. Ex. 5 | (unit: %) Comp. Ex. 6 |
| Pigment dispersion solution | 6 | 40.00 | — | — | — | — | — |
| | 7 | — | 40.00 | — | — | — | — |
| | 8 | — | — | 40.00 | — | — | — |
| | 9 | — | — | — | 40.00 | — | — |
| | 10 | — | — | — | — | 40.00 | — |
| | 11 | — | — | — | — | — | 40.00 |
| Surfactant of formula (1) | n = 3.4 m = 16.4 (*1) | 0.35 | 0.35 | 0.35 | 0.35 | 0.35 | 0.35 |
| Glycerol | | 15.00 | 15.00 | 15.00 | 15.00 | 15.00 | 15.00 |
| 1,2-Hexanediol | | — | — | — | — | — | — |
| Polyethylene glycol (*7) | | 5.00 | 5.00 | 5.00 | 5.00 | 5.00 | 5.00 |
| Acetylenol EH (*8) | | 0.10 | 0.10 | 0.10 | 0.10 | 0.10 | 0.10 |
| Styrene-methyl acrylate-acrylic acid terpolymer | | 1.30 | 1.30 | 1.30 | 1.30 | 1.30 | 1.30 |
| Pure water | | 38.25 | 38.25 | 38.25 | 38.25 | 38.25 | 38.25 |

| | | Comp. Ex. 7 | Comp. Ex. 8 | Comp. Ex. 9 | Comp. Ex. 10 | Comp. Ex. 11 | (unit: %) Comp. Ex. 12 |
|---|---|---|---|---|---|---|---|
| Pigment dispersion solution | 1 | — | — | 40.00 | 40.00 | 40.00 | 40.00 |
| | 12 | 40.00 | — | — | — | — | — |
| | 13 | — | 40.00 | — | — | — | — |
| Surfactant of formula (1) | n = 3.4 m = 16.4 (*1) | 0.35 | 0.35 | — | — | — | — |
| | n = 2.7 m = 16.2 | — | — | 0.35 | — | — | — |
| | n = 21.6 m = 15.4 (*5) | — | — | — | 0.35 | — | — |
| | n = 5.2 m = 35.3 (*6) | — | — | — | — | 0.35 | — |
| | n = 27.2 m = 30.9 | — | — | — | — | — | 0.35 |
| Glycerol | | 15.00 | 15.00 | 15.00 | 15.00 | 15.00 | 15.00 |
| 1,2-Hexanediol | | — | — | — | — | — | — |
| Polyethylene glycol (*7) | | 5.00 | 5.00 | 5.00 | 5.00 | 5.00 | 5.00 |
| Acetylenol EH (*8) | | 0.10 | 0.10 | 0.10 | 0.10 | 0.10 | 0.10 |
| Styrene-methyl acrylate-acrylic acid terpolymer | | 1.30 | 1.30 | 1.30 | 1.30 | 1.30 | 1.30 |
| Pure water | | 38.25 | 38.25 | 38.25 | 38.25 | 38.25 | 38.25 |

| | | Comp. Ex. 13 | Comp. Ex. 14 | Comp. Ex. 15 | Comp. Ex. 16 | (unit: %) Comp. Ex. 17 |
|---|---|---|---|---|---|---|
| Pigment dispersion solution | 1 | 40.00 | 40.00 | 40.00 | 40.00 | 40.00 |
| Surfactant of formula (1) | n = 3.6 m = 15.7 | 0.35 | — | — | — | — |
| | n = 26.5 m = 31.7 | — | 0.35 | — | — | — |
| | n = 27.2 m = 17.1 | — | — | 0.35 | — | — |
| | n = 3.8 m = 31.6 | — | — | — | 0.35 | — |
| Glycerol | | 15.00 | 15.00 | 15.00 | 15.00 | 15.00 |
| 1,2-Hexanediol | | — | — | — | — | — |
| Polyethylene glycol (*7) | | 5.00 | 5.00 | 5.00 | 5.00 | 5.00 |
| Acetylenol EH (*8) | | 0.10 | 0.10 | 0.10 | 0.10 | 1.00 |
| Styrene-methyl acrylate-acrylic acid terpolymer | | 1.30 | 1.30 | 1.30 | 1.30 | 1.30 |
| Pure water | | 38.25 | 38.25 | 38.25 | 38.25 | 37.70 |

(*1) Trade name: Adeka Pluronic L31; product of ADEKA CORPORATION;
(*5) Trade name: Adeka Pluronic L35; product of ADEKA CORPORATION;
(*6) Trade name: Adeka Pluronic L71; product of ADEKA CORPORATION;
(*7) Average molecular weight: 600;
(*8) Product of Kawaken Fine Chemicals Co., Ltd.

[Evaluation]

<Measurement of Dynamic Surface Tension>

With respect to the respective inks of Examples 1 to 14 and Comparative Examples 1 to 17 obtained above, the dynamic surface tensions of the inks at a lifetime of 50 milliseconds were measured by means of an apparatus (BP-D4; manufactured by Kyowa Interface Science Co., Ltd.) that measurement is conducted in accordance with the maximum bubble pressure method. The measurement of the dynamic surface tension was conducted at 25° C. The results are shown in Table 4.

<Condition of Face Surface and Ejection Stability>

Each of the inks of Examples 1 to 14 and Comparative Examples 1 to 17 obtained above was charged into a modified ink jet recording apparatus (PIXUS 850i; manufactured by Canon Inc.). Thereafter, a solid image of 18 cm×24 cm was continuously recorded on 10 sheets of PPC Paper Office Planner (product of Canon Inc.) by a default mode, and a nozzle-check pattern of the PIXUS 850i was then recorded. Incidentally, when the recording was continuously conducted, the surface of a recording head (face surface) was cleaned by a wiper blade of the ink jet recording apparatus every three sheets. Thereafter, the periphery of an ejection opening was visually observed and the condition of face surface was evaluated. The evaluation criteria as to the condition of the face surface is as follows. The evaluation results are shown in Table 4.

AA: No ink is observed at the periphery of the ejection opening;

A: An ink is scarcely observed at the periphery of the ejection opening;

B: Some ink exists at the periphery of the ejection opening, but no problem is caused upon practical use;

C: A band-shaped liquid film exists at the periphery of the ejection opening.

The nozzle-check pattern obtained above was visually observed and the ejection stability of the ink was evaluated. The evaluation criteria as to the scratch resistance is as follows. The evaluation results are shown in Table 4.

A: No disorder is observed on the nozzle-check pattern;

B: Some disorder is observed on the nozzle-check pattern, but no ejection failure occurs;

C: Ejection failure and disorder are clearly observed on the nozzle-check pattern.

<Scratch Resistance>

Each of the inks of Examples 1 to 14 and Comparative Examples 1 to 17 obtained above was charged into a modified ink jet recording apparatus (PIXUS 850i; manufactured by Canon Inc.). Thereafter, MS gothic 14-point characters and a 2-cm square solid image were respectively recorded on PPC Paper Office Planner (product of Canon Inc.). Thereafter, each recorded area was rubbed with a finger to visually observe the conditions of the characters and solid image and the scratch resistance of the image was evaluated. The evaluation criteria as to the scratch resistance is as follows. The evaluation results are shown in Table 4.

A: No stain is observed on both character-recorded area and solid image;

B: No stain is observed on the character-recorded area, but stain is observed on the solid image;

C: Stain is observed on both character-recorded area and solid image.

TABLE 4

Physical properties of ink and evaluation results

| | Dynamic surface tension at lifetime of 50 msec. [mN/m] | Condition of face surface | Ejection stability | Scratch resistance |
|---|---|---|---|---|
| Ex. 1 | 47.9 | A | A | A |
| Ex. 2 | 46.7 | B | A | A |
| Ex. 3 | 46.1 | A | A | B |
| Ex. 4 | 47.8 | B | A | B |
| Ex. 5 | 46.3 | AA | A | B |
| Ex. 6 | 47.1 | A | A | A |
| Ex. 7 | 48.2 | B | A | A |
| Ex. 8 | 48.0 | A | A | A |
| Ex. 9 | 48.6 | AA | A | A |
| Ex. 10 | 49.1 | A | A | A |
| Ex. 11 | 48.5 | AA | A | B |
| Ex. 12 | 32.3 | B | A | A |
| Ex. 13 | 49.2 | B | A | A |
| Ex. 14 | 48.7 | AA | A | A |
| Comp. Ex. 1 | 47.2 | B | B | A |
| Comp. Ex. 2 | 48.3 | C | C | A |
| Comp. Ex. 3 | 47.8 | B | A | C |
| Comp. Ex. 4 | 48.0 | B | B | C |
| Comp. Ex. 5 | 46.9 | B | B | A |
| Comp. Ex. 6 | 47.5 | C | C | A |
| Comp. Ex. 7 | 47.1 | B | B | B |
| Comp. Ex. 8 | 48.1 | B | C | B |
| Comp. Ex. 9 | 49.6 | C | C | A |
| Comp. Ex. 10 | 50.7 | C | C | A |
| Comp. Ex. 11 | 50.2 | C | C | A |
| Comp. Ex. 12 | 49.9 | C | C | A |
| Comp. Ex. 13 | 50.4 | B | C | A |
| Comp. Ex. 14 | 50.3 | C | C | A |
| Comp. Ex. 15 | 51.2 | C | C | A |
| Comp. Ex. 16 | 51.7 | B | C | A |
| Comp. Ex. 17 | 46.1 | C | C | A |

In the evaluation results as to the condition of the face surface, some results in Examples and Comparative Examples are the same rank B as each other. However, the wettability of the face surface was excellent in Examples compared with Comparative Examples as also known from the evaluation results as to the ejection stability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-138869, filed May 25, 2007, 2008-130347, filed May 19, 2008 which are hereby incorporated by reference herein their its entirety.

The invention claimed is:

1. An ink jet ink comprising:
   a polymer; and
   a surfactant,
   wherein the acid value of the polymer is from 100 mg KOH/g to 220 mg KOH/g, and a weight-average molecular weight of the polymer is from 3,000 to 10,000,
   wherein a content (% by mass) of the polymer in the ink is at least 2.0% by mass but less than 3.5% by mass based on a total mass of the ink,
   wherein a content (% by mass) of the surfactant in the ink is from 0.10% by mass to 0.35% by mass based on the total mass of the ink, and
   wherein the surfactant has a structure represented by the following formula (1)

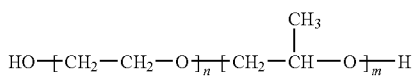

wherein n is a numerical value of from 3 to 27, and m is a numerical value of from 16 to 31.

2. The ink jet ink according to claim 1, wherein the polymer is a block copolymer.

3. The ink jet ink according to claim 1, wherein the dynamic surface tension of the ink jet ink at a lifetime of 50 milliseconds is 50 mN/m or less.

4. An ink jet recording method comprising a step of conducting recording on a recording medium by ejecting an ink by an ink jet system, wherein the ink is the ink jet ink according to claim 1.

5. An ink cartridge comprising an ink storage portion for storing an ink, wherein the ink stored in the ink storage portion is the ink jet ink according to claim 1.

6. A recording unit comprising:
   an ink storage portion for storing an ink; and
   a recording head for ejecting the ink,
   wherein the ink stored in the ink storage portion is the ink jet ink according to claim 1.

7. An ink jet recording apparatus comprising:
   an ink storage portion for storing an ink; and
   a recording head for ejecting the ink,
   wherein the ink stored in the ink storage portion is the ink jet ink according to claim 1.

8. The ink jet ink according to claim 1, wherein the content (% by mass) of the polymer in the ink is at least 2.5% by mass but less than 3.5% by mass based on the total mass of the ink.

9. The ink jet ink according to claim 1, further comprising a pigment dispersed by the polymer.

10. The ink jet ink according to claim 9, wherein the polymer comprises an acrylic acid unit.

11. The ink jet ink according to claim 9, wherein the polymer comprises an acrylic acid salt.

12. An ink jet recording method comprising a step of conducting recording on a recording medium by ejecting an ink jet ink, wherein the ink comprises:
    a pigment dispersed by a polymer; and
    a surfactant,
    wherein the acid value of the polymer is from 100 mg KOH/g to 220 mg KOH/g, and a weight-average molecular weight of the polymer is from 3,000 to 10,000,
    wherein the polymer comprises a hydrophilic monomer and a hydrophobic monomer,
    wherein the mass ratio of the hydrophilic monomer to the hydrophobic monomer is from 0.4 to 1.5, and
    wherein the surfactant has a structure represented by the following formula (1)

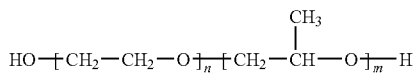

wherein n is a numerical value of from 3 to 27, and m is a numerical value of from 16 to 31.

13. The ink jet recording method according to claim 12, wherein a content (% by mass) of the surfactant in the ink is from 0.05% by mass to 0.5% by mass based on the total mass of the ink.

14. The ink jet ink according to claim 1, further comprising water and a water-soluble organic solvent,
    wherein the content (% by mass) of the water in the ink is from 50.0% by mass to 95.0% by mass based on the total mass of the ink, and
    wherein the content (% by mass) of the water-soluble organic solvent in the ink is from 3.0% by mass to 50.0% by mass based on the total mass of the ink.

15. The ink jet recording method according to claim 12, further comprising water and a water-soluble organic solvent,
    wherein the content (% by mass) of the water in the ink is from 50.0% by mass to 95.0% by mass based on the total mass of the ink, and
    wherein the content (% by mass) of the water-soluble organic solvent in the ink is from 3.0% by mass to 50.0% by mass based on the total mass of the ink.

16. The ink jet ink according to claim 14, wherein the dynamic surface tension of the ink jet ink at a lifetime of 50 milliseconds at 25° C. is 50 mN/m or less,
    wherein the ink further comprises a water-insoluble coloring material,
    wherein the content (% by mass) of the water-insoluble coloring material in the ink is from 1.0% by mass to 10.0% by mass based on the total mass of the ink,
    wherein the polymer comprises a hydrophilic monomer and a hydrophobic monomer, and
    wherein the mass ratio of the hydrophilic monomer to the hydrophobic monomer is from 0.4 to 1.5.

17. The ink jet ink according to claim 16, wherein the water-insoluble coloring material comprises carbon black,
    wherein the ink further comprises a moisture-retaining compound,
    wherein the content (% by mass) of the moisture-retaining compound in the ink is from 3.0% by mass to 10.0% by mass based on the total mass of the ink, and
    wherein the polymer comprises styrene-methyl acrylate-acrylic acid terpolymer.

* * * * *